Feb. 26, 1929.　　　　　　　　　　　　　　　　1,703,094
T. A. BRYSON
CENTRIFUGAL SEPARATOR
Original Filed Sept. 29, 1925　　2 Sheets-Sheet 1
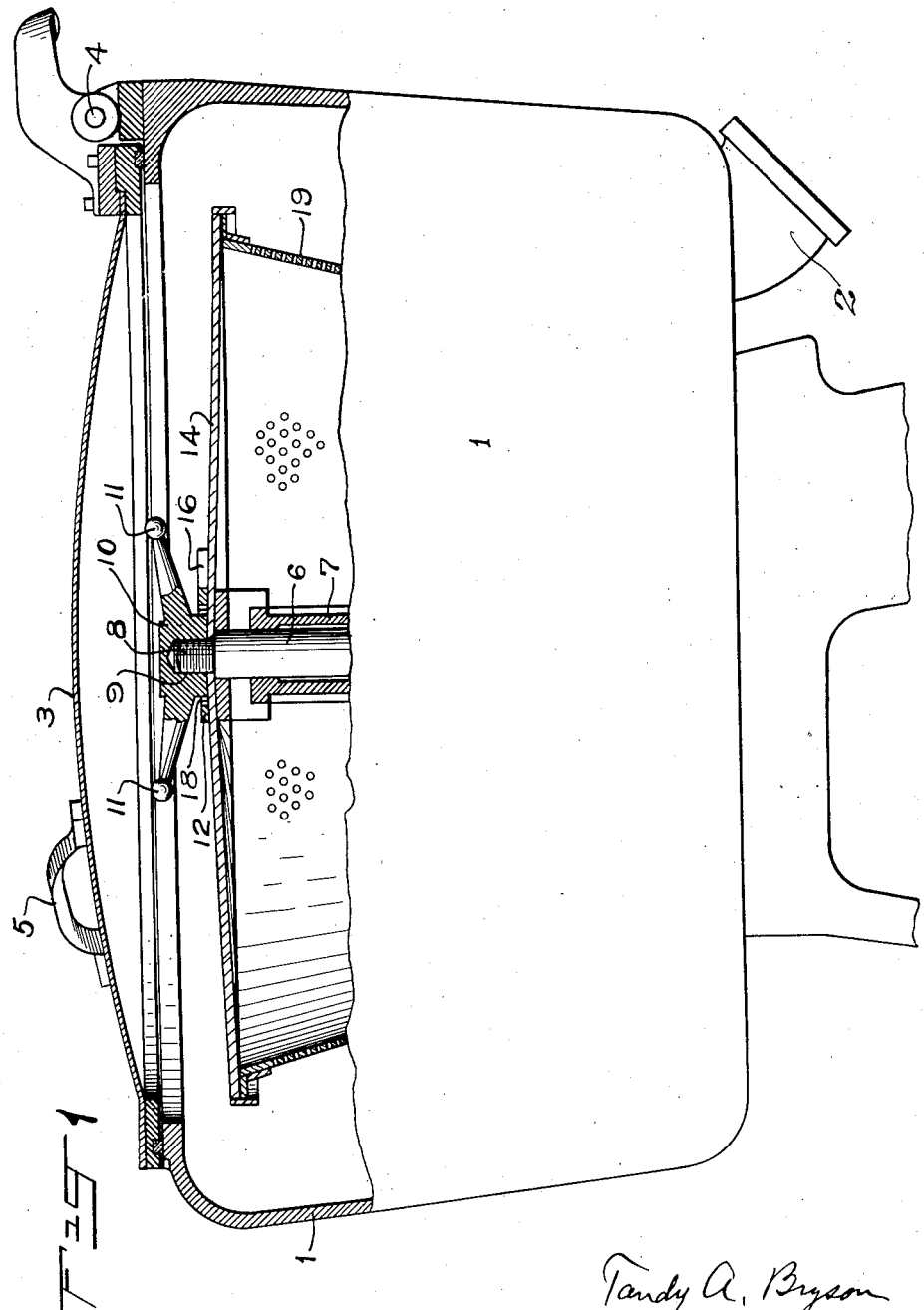
Tandy A. Bryson
INVENTOR.
BY John D. Morgan
ATTORNEYS.

Feb. 26, 1929.
T. A. BRYSON
1,703,094
CENTRIFUGAL SEPARATOR
Original Filed Sept. 29, 1925  2 Sheets-Sheet 2
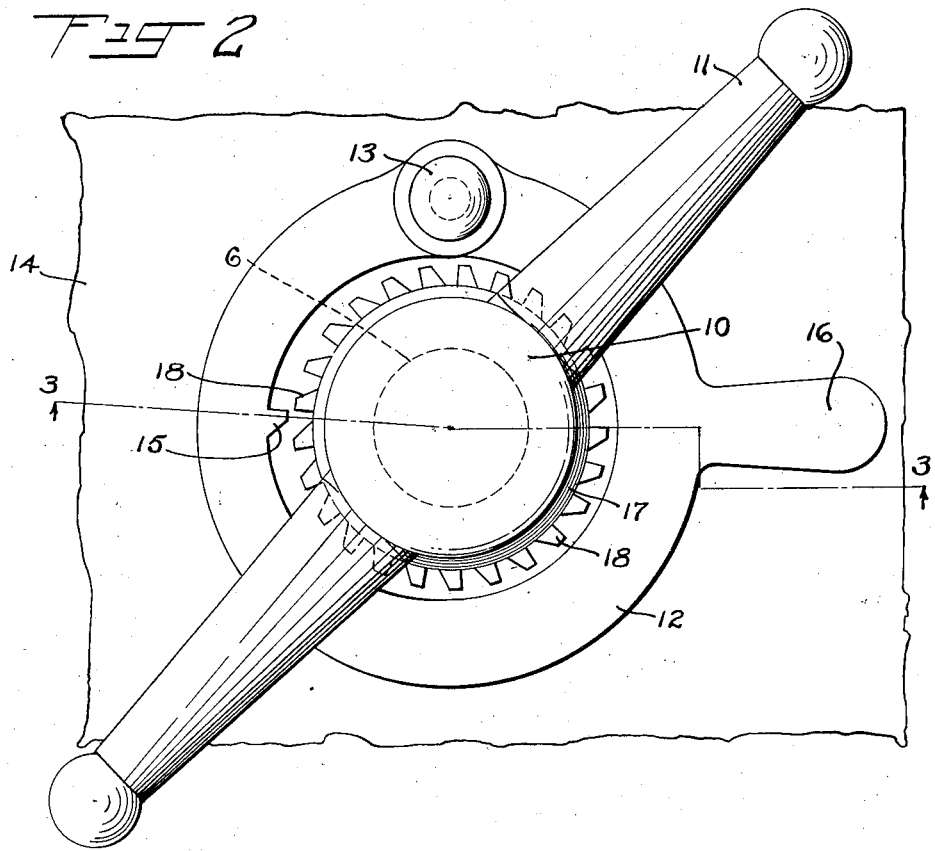
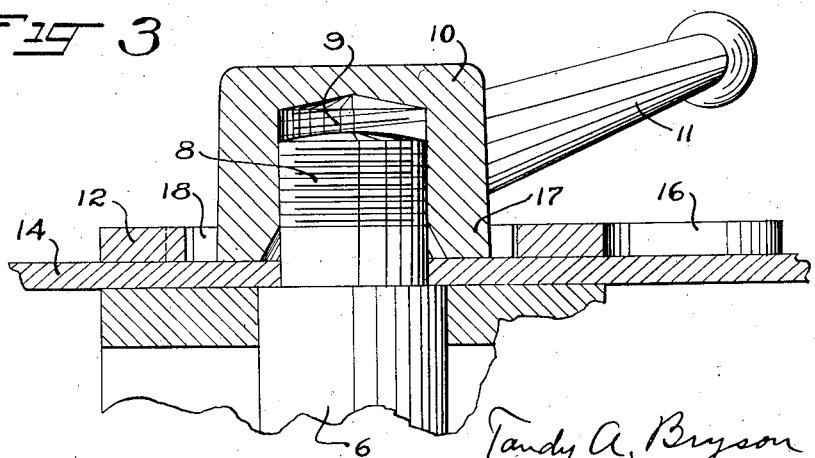
Tandy A. Bryson
INVENTOR
BY John D. Morgan
ATTORNEY Patented Feb. 26, 1929.

1,703,094

UNITED STATES PATENT OFFICE.

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK.

CENTRIFUGAL SEPARATOR.

Original application filed September 29, 1925, Serial No. 59,271. Divided and this application filed December 30, 1925. Serial No. 78,497.

This invention relates to centrifugal separators and more particularly to safety devices for said devices.

My invention further relates to certain combinations, sub-combinations, and articles of manufacture, as will be more fully hereinafter described and pointed out in the claims.

Other objects and advantages of the invention will be set forth in part hereinafter and in part will be obvious herefrom, or may be learned by practice with the invention, the same being realized and attained by means of the instrumentalities and combinations pointed out in the appended claims.

This application is a division of my copending application Ser. No. 59,271 filed September 29, 1925.

The accompanying drawings, referred to herein and constituting a part hereof, illustrate one embodiment of the invention, and together with the description, serve to explain the principles of the invention.

Of the drawings:—

Fig. 1 is a side elevation of a centrifugal separator, equipped with my invention;

Fig. 2 is a plan view, on an enlarged scale, of the basket cover shown in Fig. 1;

Fig. 3 is a vertical section, on an enlarged scale, substantially on the line 3—3 of Fig. 2, looking in the direction of the arrows.

In centrifugal separators it is common to use wing nuts to cooperate with the spindles or axles of the separators, but it is found in practice that there have been many narrow escapes from injury from flying wing nuts. Also there have been narrow escapes from flying contents of the basket, as for example, showers of machine tool chips which were being separated from cutting oil.

To minimize the danger of the wing nuts flying off of the spindle during the operation of the centrifugal, and injury from such nuts, or from the contents of the basket, some users provide the wing nut and the end of the spindle with registering holes, and wire the wing nut to the spindle before each run. This, of course, takes time, is troublesome, and adds to the labor and cost of operation.

By my invention the centrifugal force of the rotating parts of the separator will automatically lock the wing nut and prevent its relative movement on the threaded end of the spindle or axle regardless of what speeds the spindle may be rotated.

In the embodiment of my invention, shown in the drawings, 1 is the case of any suitable centrifugal separator, having the ordinary outlet 2, dome 3 hinged on the pivot 4 and provided with the handle 5. The spindle or axle 6 cooperates with the basket hub 7 and is provided with male screw-threads on its end 8 to cooperate with the female threads 9 in the wing nut 10. This wing nut is provided with the usual wings 11, 11 and, in addition thereto, is provided with a locking or engaging member to cooperate with a second locking member, the two members being thrown into locking engagement by centrifugal force.

In the particular embodiment of my invention, shown in Figs. 1, 2, and 3, I pivot a yoke 12 on the pivot 13 to the basket cover 14. This yoke is provided with a pawl or tooth 15 (Fig. 2) and also preferably with an eccentrically mounted, weighted arm 16. On the lower portion of the wing nut 10, I provide a ratchet flange 17, having the teeth 18, 18.

After the basket 19 has been filled with the articles to be treated in the separator, the basket cover 14 is placed over the screw-threaded end 8 of the spindle 6, and then the wing nut 10 is screwed up against the basket cover 14. The parts will then be in substantially the position shown in Fig. 2, in which the pawl 15 is disengaged from the teeth 18 of the ratchet flange 17. The dome 3 is then used to close the centrifugal case 1 preparatory to rotating the spindle 6. As soon as power is applied to the spindle 6 it will rotate the basket 19 and basket cover 14 clockwise. Due to its inertia, the wing nut 10 will tend to rotate counter-clockwise relatively to the basket cover, that is, to back off. Almost instantly the centrifugal force will cause the pivoted yoke 12 to rock upon the pivot 13 and move from the position shown in Fig. 2 so as to cause the pawl 15 to engage with one of the teeth 18 on the ratchet flange 17. The eccentrically weighted arm 16 actuated by the centrifugal force assists this rocking of the pivoted yoke 12. As soon as this pawl engages with one of these teeth 18, the wing nut is locked and cannot screw off of the screw-threaded portion 8 of the spindle 6.

In stopping the rotation of the basket 19 and spindle 6 by the ordinary brake, not shown, there will be a tendency, due to the continued rotation of the wing nut 10 for it to become disengaged from the pawl or tooth 15. It is possible, due to the spring of the basket cover 14 and backlash that a tooth 18 of the ratchet 17 on the cap might slip under the pawl 15, but there will be no injury or disastrous effect on the mechanism because the stressing of the parts in this direction simply screws up the wing nut tighter upon the spindle 6. A small amount of back-lash between the pawl 15 and the nut 10 makes no difference since the cover 14 is springy and the nut does not have to be screwed up to a definite stop. In starting the centrifugal, the nut may tend to back off until the pawl and ratchet are engaged; however, this will be almost instantly. The eccentric weighted arm 16 also acts as a handle or lever to disengage the pawl 15 from the particular tooth 18 with which it is in engagement on the ratchet 17.

The invention in its broader aspects is not limited to the specific mechanisms shown and described, but departures may be made therefrom within the scope of the accompanying claims without departing from the principles of the invention and without sacrificing its chief advantages.

What I claim is:—

1. The combination in centrifugal separators of a spindle provided with screw-threads, a basket, a cover for the basket, a nut mounted on the screw-threaded spindle to secure the cover, said nut being provided with a locking part, and a centrifugally operated locking member mounted on the cover, and adapted to engage with the locking part and prevent the disengagement of the nut from the spindle on rotation in one direction, disengagement in the other direction being prevented by the cooperating screw-threads.

2. The combination in centrifugal separators of a spindle provided with screw-threads, a basket, a cover for the basket, a wing nut mounted on the screw-threaded spindle to secure the cover, said wing nut being provided with a ratchet flange, and a centrifugally operated locking member mounted on the cover, and adapted to engage with the ratchet flange and prevent the disengagement of the nut from the spindle on rotation in one direction, disengagement in the other direction being prevented by the cooperating screw-threads.

3. The combination in a centrifugal separator of a driven spindle provided with screw-threads, a basket, a cover for the basket, a winged nut mounted on the screw-threaded spindle to secure the cover to the spindle, said wing nut being provided with a ratchet flange, a yoke pivoted on the cover and provided with a pawl to engage with the ratchet flange and prevent the disengagement of the wing nut from the spindle on rotation in one direction, disengagement in the other direction being prevented by the cooperating screw-threads.

4. The combination in a centrifugal separator of a driven spindle provided with screw-threads, a basket, a cover for the basket, a winged nut mounted on the screw-threaded spindle to secure the cover to the spindle, said wing nut being provided with a ratchet flange, a yoke pivoted on the cover and provided with an eccentrically mounted arm and also with a pawl to engage with the ratchet flange and prevent the disengagement of the wing nut from the spindle on rotation in one direction, disengagement in the other direction being prevented by the cooperating screw-threads.

5. The combination in a centrifugal separator of a driving member provided with engaging surfaces to cooperate with a locking member, a basket, a cover for the basket, a locking member to secure the cover, said locking member being provided with engaging surfaces to cooperate with the engaging surfaces on the driving member and also provided with a locking part, a centrifugally operated lock mounted on the cover and adapted to engage with the locking part carried by the locking member and prevent the disengagement of the locking member from the driving member in one direction, disengagement in the other direction being prevented by the cooperating engaging surfaces on the driving and locking members.

6. The combination in a centrifugal separator of a driving spindle having screw-threads for a locking nut, a basket, a cover, a nut to lock the cover, and centrifugally operated means to prevent the accidental disengagement of the nut.

7. The combination in a centrifugal separator of a driving member, a basket, a cover, a locking member cooperating with the driving member for securing the cover to the basket and means automatically operable on the rotation of the members for preventing accidental disengagement of the locking member from the driving member.

8. The combination in a centrifugal separator of a driving member, a basket, a cover, a locking member on the driving member for securing the cover to the basket and centrifugal means for preventing accidental disengagement of the locking member from the driving members while the members are rotating.

9. The combination in a centrifugal separator of a driving member, a basket, a cover, a locking member on the driving member for securing the cover to the basket and means adapted to automatically engage the locking member when the members begin to rotate in order to prevent their disengagement.

10. The combination in a centrifugal separator of a driving member, a basket, a cover, a locking member on the driving member for securing the cover to the basket and means adapted to automatically engage the locking member while the members are rotating in order to prevent their disengagement.

11. The combination in a centrifugal separator of a driving spindle having screw threads for a locking unit, a basket, a cover, a nut to lock the cover and means automatically operable on the rotation of the driving spindle, basket and cover to prevent the accidental disengagement of the nut.

In testimony whereof, I have signed my name to this specification.

TANDY A. BRYSON.